United States Patent
Oriakhi

(10) Patent No.: US 9,783,693 B2
(45) Date of Patent: *Oct. 10, 2017

(54) WHITE INK

(71) Applicant: Fujifilm Imaging Colorants, Inc., New Castle, DE (US)

(72) Inventor: Christopher Oriakhi, New Castle, DE (US)

(73) Assignee: Fujifilm Imaging Colorants, Inc., New Castle, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/772,590

(22) PCT Filed: Feb. 14, 2014

(86) PCT No.: PCT/GB2014/050429

§ 371 (c)(1),
(2) Date: Sep. 3, 2015

(87) PCT Pub. No.: WO2014/135843

PCT Pub. Date: Sep. 12, 2014

(65) Prior Publication Data

US 2016/0002481 A1    Jan. 7, 2016

Related U.S. Application Data

(60) Provisional application No. 61/773,372, filed on Mar. 6, 2013.

(51) Int. Cl.
| | | |
|---|---|---|
| *C09D 11/322* | (2014.01) | |
| *C09D 11/38* | (2014.01) | |
| *C09D 7/12* | (2006.01) | |
| *C08K 9/02* | (2006.01) | |
| *B32B 3/00* | (2006.01) | |
| *B41J 2/01* | (2006.01) | |
| *C08K 5/01* | (2006.01) | |

(52) U.S. Cl.
CPC .............. *C09D 11/38* (2013.01); *C08K 5/01* (2013.01); *C09D 7/1216* (2013.01); *C09D 11/322* (2013.01); *C08K 9/02* (2013.01)

(58) Field of Classification Search
CPC .... C09D 11/322; C09D 11/38; C09D 7/1225; C08K 9/02; B32B 3/00; B41J 2/01
USPC ....... 106/31.6, 31.86, 31.9; 347/20; 428/207
See application file for complete search history.

(56) References Cited

U.S. PATENT DOCUMENTS

| | | | | |
|---|---|---|---|---|
| 4,680,058 A * | 7/1987 | Shimizu | ................ | C09D 11/36 106/31.86 |
| 7,279,511 B2 * | 10/2007 | Zhu | ................ | C09D 11/322 106/31.6 |
| 7,850,774 B2 * | 12/2010 | Oriakhi | ................ | C09D 11/322 106/31.65 |
| 9,580,613 B2 * | 2/2017 | Oriakhi | ................ | C09D 11/322 |
| 2007/0060670 A1 | 3/2007 | Ellis | | |
| 2008/0173214 A1 * | 7/2008 | Oyanagi | ................ | C09D 11/36 106/31.25 |
| 2008/0268156 A1 * | 10/2008 | Ueno | ................ | D06P 1/6735 427/288 |
| 2016/0083598 A1 * | 3/2016 | Oriakhi | ................ | C09D 11/38 347/20 |

OTHER PUBLICATIONS

English translation of the Written Opinion of the International Search Authority mailed Sep. 17, 2015 for PCT/GB2014/050429; 4 pages.*

* cited by examiner

*Primary Examiner* — Helene Klemanski
(74) *Attorney, Agent, or Firm* — Banner & Witcoff, Ltd.

(57) ABSTRACT

An ink comprising: (a) from 1 to 20 parts of surface treated titanium dioxide; (b) from 20 to 70 parts of viscosity modifier; (c) from 5 to 30 parts of one or more water miscible polar organic solvent(s); (d) from 0.1 to 3 parts of surfactant; (e) from 0.001 to 5 parts of biocide; (f) from 0 to 20 parts of polymer particles; (g) the balance to 100 parts water; wherein the ink has a viscosity in the range of from 10 to 25 mPa·s when measured at 32° C. using a Brookfield spindle SOO at 3 or 12 rpm depending on whether the viscosity is < or >16 mPa·s. Also ink jet printing processes, printed substrates, ink containers and ink-jet printers.

11 Claims, No Drawings

WHITE INK

RELATED APPLICATION DATA

This application is a National Stage application under 35 U.S.C. 371 of co-pending PCT application number PCT/GB2014/050429 designating the United States and filed Feb. 14, 2014; which claims the benefit of U.S. provisional application No. 61/773,372 and filed Mar. 6, 2013 each of which are hereby incorporated by reference in their entireties.

This invention relates to white inks, a process for ink-jet printing, ink-jet ink containers and ink-jet printers.

White inks are used to provide good visibility when printed on transparent and coloured surfaces. White printing on these surfaces is desirable in numerous end uses, such as the computer industry (printed circuit boards, computer chips), recording industry (tapes, film, etc.), packaging and automotive coatings. White ink is used not only to detail and add decals to automobiles, but also to other motor vehicles, including trucks, planes and trains, as well as bicycles, etc. White ink can also be useful on other surfaces, such as plastics, wood, metal, glass, textiles, polymeric films and leather for both practical and ornamental purposes.

A preferred means of applying white ink is by ink-jet printing.

Ink-jet printing is a non-impact printing technique in which droplets of an ink are ejected through fine nozzles onto a substrate without bringing the nozzles into contact with the substrate. There are basically three types of ink-jet printing:
i) Continuous ink-jet printing uses a pressurized ink source that produces a continuous stream of ink droplets from a nozzle. The droplets of ink are directed either thermally or by electrostatic means at a nominally constant distance from the nozzle. Those droplets which are not successfully deflected are recycled to the ink reservoir via a gutter.
ii) Drop-on-demand ink-jet printing where the ink is stored in a cartridge and fired from the print-head nozzle using a pressurization actuator (usually thermal or piezoelectric). With drop-on-demand printing only the drops that are required for printing are produced.
iii) Re-circulating ink-jet printing where the ink is continuously re-circulated in the print-head and (as in drop-on demand printing) only drops required for printing are drawn off to the nozzle.

Each of these types of ink-jet printing presents unique challenges. Thus, in continuous ink-jet printing ink active solvent monitoring and regulation is required to counter solvent evaporation during the time of flight (time between nozzle ejection and gutter recycling), and from the venting process whereby excess air (drawn into the reservoir when recycling unused drops) is removed.

In drop-on demand printing the ink may be kept in the cartridge for long periods when it can deteriorate and form precipitates which can, in use, block the fine nozzles in the print-head. This problem is particularly acute with pigment inks where the suspended pigment can settle out.

Re-circulating ink-jet printing avoids these problems. Since the ink is constantly circulating it lessens the chance of precipitates forming and as the ink is only removed to the nozzle as required solvent evaporation is minimised.

Re-circulating ink-jet printers have found particular utility in the industrial sector. Industrial ink-jet printers are required to work at high speeds. Optimally a print-head for an industrial ink-jet printer will have multiple nozzles arranged at a high density to enabling single-pass printing.

Ink formulation for all forms of ink-jet printing is extremely demanding. It is especially difficult to formulate inks able to work in these high speed single pass print-heads.

There are particular problems associated with the use of white inks in ink-jet printing. For example, titanium dioxide is a common white ink pigment and is generally three to four times heavier than pigments for other color inks. Thus, pigments such as titanium dioxide have a much greater tendency to precipitate and clog the nozzles of inkjet systems.

One means of stabilising a titanium dioxide containing ink is to increase its viscosity. However such inks have to be diluted prior to jetting.

The present inventors have devised an ink formulation which is viscous enough to prevent the titanium dioxide pigment from precipitating but which does not need to be diluted prior to jetting.

Therefore, according to a first aspect of the present invention there is provided an ink comprising:
(a) from 1 to 20 parts of surface treated titanium dioxide;
(b) from 20 to 70 parts of viscosity modifier;
(c) from 5 to 30 parts of one or more water miscible polar organic solvent(s);
(d) from 0.1 to 3 parts of surfactant;
(e) from 0.001 to 5 parts of biocide;
(f) from 0 to 20 parts of polymer particles;
(g) the balance to 100 parts water;
wherein the ink has a viscosity in the range of from 10 to 25 mPa·s when measured at 32° C. using a Brookfield spindle S00 at 3 or 12 rpm depending on whether the viscosity is < or >16 mPa·s.

All parts and percentages herein (unless stated otherwise) are by weight.

The titanium dioxide present in the surface treated titanium dioxide pigment may be in rutile or anatase form or in a mixture of the two forms.

The titanium dioxide particles can have a wide variety of average particle sizes of about 1 micron or less, depending on the desired end use application of the ink.

The titanium dioxide pigment is in and of itself white in color.

For applications demanding high hiding or decorative printing applications, the titanium dioxide particles preferably have a Z average mean particle diameter of less than 1 micron (1000 nm). Preferably, the particles have a Z average mean particle diameter of from 50 to 950 nm, more preferably from 75 to 750 nm, and still more preferably from 100 to 500 nm. It is especially preferred that the titanium dioxide particles have a Z average mean particle diameter of from 125 to 350 nm and more especially of from 150 to 300 nm. The Z average mean particle diameter may be readily measured using a Zetasizer® from Malvern Instruments. Titanium dioxide particles of this size are commonly called pigmentary titanium dioxide.

For applications demanding white color with some degree of transparency, the pigment preference is "nano" titanium dioxide. "Nano" titanium dioxide particles typically have a Z average mean particle diameter ranging from about 10 to about 200 nm, preferably from about 20 to about 150 nm, and more preferably from about 35 to about 75 nm. An ink comprising nano titanium dioxide can provide improved chroma and transparency, while still retaining good resistance to light fade and an appropriate hue angle.

In addition, unique advantages may be realized with multiple particle sizes, such as opaqueness and UV protection. These multiple sizes can be achieved by adding both a pigmentary and a nano grade of titanium dioxide.

The Zetasizer polydispersity index, measured using a Zetasizer from Malvern Instruments, of the titanium dioxide particles in the ink is preferably less than 0.2.

The titanium dioxide is preferably incorporated into an ink formulation via a slurry concentrate composition. The amount of titanium dioxide present in the slurry composition is preferably from about 20 wt % to about 80 wt %, based on the total slurry weight.

The titanium dioxide pigment may be substantially pure titanium dioxide or may comprise other metal oxides. These other metal oxides are preferably one or more selected from the group consisting of silica, alumina, zirconia and mixtures thereof. Other metal oxides may become incorporated into the pigment particles, for example, by co-oxidizing or co-precipitating titanium compounds with other metal compounds. If the titanium dioxide pigment comprises co-oxidized or co-precipitated metals, they are preferably present as the metal oxide in an amount from 0.1 wt % to 20 wt %, more preferably from 0.5 wt % to 5 wt %, and still more preferably from 0.5 wt % to 1.5 wt %, based on the total titanium dioxide pigment weight.

In a preferred embodiment the surface of the surface treated titanium dioxide is coated with an inorganic compound selected from the group consisting of silica, alumina, alumina-silica or zirconia. More preferably the surface of the surface treated titanium dioxide is treated with alumina, silica or a mixture thereof. Such coatings may be present in an amount of from 0.1 wt % to 10 wt %, and preferably from 0.5 wt % to 3 wt %, based on the total weight of the titanium dioxide.

The surface of the surface treated titanium dioxide may also carry one or more organic surface coatings. The organic surface coatings are, for example, selected from the group consisting of carboxylic acids, silanes, siloxanes and hydrocarbon waxes, and their reaction products. The amount of organic surface coating generally ranges from 0.01 wt % to 6 wt %, preferably from 0.1 wt % to 3 wt % and more preferably from 0.5 wt % to 1.5 wt % based on the total weight of the titanium dioxide.

Preferred surface treatments for the surface treated titanium dioxide include alumina, silicate, methicone, polydimethylsiloxyethyl dimethicone, triethoxysilylethyl polydimethylsiloxyethyl dimethicone, PEG-10 dimethicone, PEG-9 polydimethylsiloxyethyl dimethicone, PEG-8 methyl ether triethoxysilane, isopropyl titanium triisostearate and triethoxycaprylylsilane. The surface treatments for the surface treated titanium dioxide can also be a hybrid treatments such as polyhydroxystearic acid and silane (especially triethoxycaprylylsilane and polyhydroxystearic acid), isopropyl titanium triisostearate and alumina and triethoxysilylethyl polydimethylsiloxyethyl dimethicone, isopropyl titanium triisostearate and triethoxysilylethyl polydimethylsiloxyethyl dimethicone.

In one preferred embodiment the surface treated titanium dioxide is treated so it has a hydrophilic character.

In a preferred embodiment the surface of the surface treated titanium dioxide is treated with alumina, silica or a mixture thereof.

Preferably the surface treated titanium dioxide is a cosmetic grade material.

The surface treated titanium dioxide is preferably present in the range of from 1 to 12 parts 3 to 11 parts and more preferably in the range of from 6 to 10 parts.

Mixtures of titanium dioxide with different surface treatments may also be used.

Component (b) the viscosity modifier is preferably selected from the group consisting of glycerol, polyethers, (such as polyethylene glycol and poly(ethylene oxide)), cellulose polymers such as hydroxyethyl cellulose, hydroxypropyl cellulose and carboxymethyl cellulose, water-soluble acrylics, water-soluble polyesters, water-soluble polyurethanes, homopolymers of 2-ethyl-oxazoline (e.g. poly-2-ethyl-2-oxazoline), poly(vinyl alcohol) and poly(vinylpyrrolidones) and mixtures thereof.

In one preferred embodiment in the ink of the present invention component (b) comprises from 20 to 60 parts of glycerol or a mixture of glycerol and polyethylene glycol (especially 15 to 45 parts of glycerol and 1 to 4 parts of polyethylene glycol 20K).

Component (c) may comprise any suitable water miscible solvent or mixture thereof.

Preferred water-miscible organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-2-ethoxyethoxy)-ethoxy]-ethanol and ethylene glycol monoallyl ether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulfoxides, preferably dimethyl sulfoxide; and sulfones.

Preferred water-miscible organic solvents are cyclic amides, especially 2-pyrrolidone, N-methyl-pyrrolidone and N-ethyl-pyrrolidone; diols, especially 1,5-pentane diol, ethylene glycol, diethylene glycol and triethylene glycol; and mono-$C_{1-4}$-alkyl and $C_{1-4}$-alkyl ethers of diols, more preferably mono-$C_{1-4}$-alkyl ethers of diols having 2 to 12 carbon atoms, especially 2-methoxy-2-ethoxy-2-ethoxyethanol.

Especially preferred solvents include 2-pyrrolidone, ethylene glycol, propylene glycol and diethylene glycol.

Preferably component (c) comprises 1 to 3 solvents selected from 2-pyrrolidone, ethylene glycol and diethylene glycol.

Preferably component (c) is present in the range of from 5 to 20 parts.

The surfactant used as component (d) may be ionic or, more preferably, non-ionic. Acetylenic surfactants, fluoro surfactants and silicon surfactants are preferred. Examples of fluoro surfactants include Zonyl® and Capstone® grades from DuPont, e.g. Zonyl® FSO, FSN and FSA and short-chain perfluoro-based anionic fluorosurfactants such as Chemguard S-103A available from Chemguard. Acetylene surfactants are more preferred especially 2,4,7,9-tetramethyl-5-decyne-4,7-diol and ethylene oxide condensates thereof, for example Surfynol® and Dynol® surfactants available from Air Products. The ethylene oxide condensates of 2,4,7,9-tetramethyl-5-decyne-4,7-diol are particularly preferred. Mixtures containing different surfactants may be used. Mixed surfactants may be of the same type e.g. two non-ionic surfactants or be of different types e.g. an ionic and non-ionic surfactant.

Component (d) is preferably present in the composition in an amount of from 0.001 to 2.5 parts, more preferably from 0.01 to 2 parts, especially from 0.05 to 1.5 parts, more especially from 0.1 to 1.2 parts and particularly from 0.5 to 1.0 parts.

For component (e) any biocide (or mixture of biocides) which is stable in the ink may be used. It is particularly preferred that the biocide comprises 1,2-benzisothazolin-3-one which is available as a 20% active solution from Lonza as Proxel® GXL and Bioban®, DXN (2,6-dimethyl-1,3-dioxan-4-yl acetate), from Dow Chemical Company.

The ink may optionally comprise polymer particles (component (f)). Any kind of polymer (or copolymeric) particles may be used without limitation. The polymer in the polymer particles may be a polystyrenic, poly(meth)acrylic, poly-co-styreneic-(meth)acrylic, polyester, polyether, polyurethane, polycarbonate or polyamide polymer including grafts and physical blends thereof. The polymer may also be a natural polymer such as a cellulosic, protein or wax.

Preferably, the polymer particles have an average particle diameter of no more than 1 micron, more preferably from 10 to 500 nm, and especially from 100 to 200 nm and most especially from 30 to 150 nm. The preferred method for establishing the particle size of the polymer particles is by photon correlation spectroscopy.

When present the polymer particles may be used to assist in binding of the surface treated titanium dioxide to the substrate or to improve the gloss of the final print. Polymer particles tend to have little influence on the ink rheology at typical dilutions.

Particularly preferred polymer particles are those prepared by polymerising ethylenically unsaturated monomers (especially acrylates, methacrylates, styrenics etc). Other useful polymer particles include polyesters and polyurethanes. The polymer particles tend to have a solubility of less than 5%, more preferably less than 1% by weight by weight in water.

We have found that the presence of larger amounts of polymer particles can be detrimental to ink jet operability and latency. Thus, it is preferred that the amount of polymer particles in the ink is no more than 15, more preferably no more than 12, especially no more than 10 parts, more especially no more than 5 parts and most especially no more than 3 parts by weight. In some cases the amount of polymer particles in the ink is from 0.1 to 15, more preferably from 1 to 12 parts and especially from 3 to 10 parts by weight. We have found that these amounts of polymer particles tend to improve the adhesion and wet-fastness properties of the final ink printed on a substrate.

In some cases it is preferred that polymer particles are absent from the ink.

Polymer particles can be made by many possible methods including solution dispersion, melt dispersion, suspension and especially emulsion polymerisation methods.

The polymer particles can be colloidally stabilised by an adsorbed surfactant and/or by water-dispersing groups which are part of the polymer particle structure.

Preferably the ink has a viscosity in the range of from 10 to 20 mPa·s, more preferably from 11 to 18 mPa·s and it is especially preferred that the ink has a viscosity in the range of from 12 to 16 mPa·s ink when measured at 32° C. using a Brookfield spindle S00 at 3 or 12 rpm depending on whether the viscosity is < or >16 mPa·s.

The ink preferably has a surface tension from 20 to 65 dynes/cm, more preferably from 20 to 50 dynes/cm, especially 25 to 40 dynes/cm, when measured at 25° C. using a Kruss K-11 Tensiometer (Wilhelmy Plate Method)

Preferably, the ink composition has been filtered through a filter having a mean pore size of less than 10 microns, more preferably less than 5 microns and especially less than 1 micron.

Preferably the ink has a pH in the range of from 7 to 9. The pH may be adjusted by means of a suitable buffer.

In addition to the above mentioned components, the ink composition may optionally comprise one or more ink additives. Preferred additives suitable for ink-jet printing inks are anti-kogation agents, rheology modifiers, corrosion inhibitors and chelating agents. Preferably, the total amount of all such additives is no more than 10 parts by weight. These additives are added to and comprise part of component (g), the water added to the ink.

In a preferred embodiment the ink comprises:
(i) from 1 to 12 parts of surface treated titanium dioxide;
(ii) from 20 to 60 parts of glycerol or a mixture of glycerol and polyethylene glycol;
(iii) from 5 to 20 parts of water miscible organic solvent consisting of 1 to 3 solvents selected from, 2-pyrrolidone, ethylene glycol and diethylene glycol.
(iv) from 0.05 to 1.5 parts of an acetylenic surfactant;
(v) from 1 to 12 parts of polymer particles;
(vi) the balance to 100 parts water; and
wherein the ink has a viscosity in the range of from 10 to 20 mPa·s when measured at 32° C. using a Brookfield spindle S00 at 3 or 12 rpm depending on whether the viscosity is < or >16 mPa·s.

The white ink of the present invention is of particular value for printing coloured, transparent and semi-transparent substrates. White printing on these surfaces is desirable in numerous end uses, such as the computer industry (printed circuit boards, computer chips), recording industry (tapes, film, etc.), packaging and automotive coatings. White ink is also useful on other surfaces, such as plastics, wood, metal, glass, textiles, polymeric films and leather for both practical and ornamental purposes.

A second aspect of the invention provides an ink-jet printing process wherein the ink according to the first aspect of the invention is printed onto a substrate by means of an ink jet printer. Preferably using an ink-jet printer with an ink re-circulating print-head.

The process of the present invention may use any ink-jet printer with an ink re-circulating print-head. Preferably the print-head has an ink re-circulation channel in the ink supply system. This channel allows for fresh ink to be available for jetting and can be part of the ink supply system or even specially engineered channels which run behind the nozzle plate. It is preferred that the ink supply system runs behind the nozzle plate as this allows for the use of more volatile inks whilst not compromising restart/latency behaviour. Behind nozzle plate re-circulation is exemplified in commercially available Fujifilm Dimatix print-heads such as Samba® or SG1024®.

A third aspect of the present invention provides a substrate printed by an ink-jet printing process as described in the second aspect of the invention using an ink as described in the first aspect of the invention. This substrate is as described and preferred in the first aspect of the invention.

According to a fourth aspect of the present invention there is provided an ink-jet printer ink container (e.g. a cartridge or a larger ink tank), containing an ink as defined in the first aspect of the present invention A fifth aspect of the present invention provides an ink-jet printer with re-circulating printer head containing an ink, as described in the first aspect of the invention.

The invention is further illustrated by the following Examples in which all parts and percentages are by weight unless otherwise stated.

EXAMPLES 1 AND 2

Composition of Example Inks 1 and 2

Example inks 1 and 2 were prepared by mixing all the components except the titanium dioxide dispersion. The pH was measured and adjusted to pH 8.0 to 8.3 with 5% ammonium hydroxide solution to give a pre-ink mixture. The titanium dioxide dispersion was diluted with a small amount of the pre-ink mixture and then was slowly added to the pigment dispersion. The pH was again measured and adjusted if it had fallen below 8.0. The resulting ink was filtered through a 1.0 micron syringe filter.

| Component | Example Ink 1 | Example Ink 2 |
| --- | --- | --- |
| Titanium Dioxide | 8 | 8 |
| Ethylene Glycol | 10 | 10 |
| Surfynol 465 | 0.6 | 0.4 |
| Glycerol | 30 | 50 |
| 2-Pyrrolidone | 5 | 5 |
| PEG 20,000 | 2.65 | 0 |
| Proxel GXL | 0.02 | 0.02 |
| Water | To 100 parts | To 100 parts |

The surface treated titanium dioxide was GLW75PFSP from Kobo Products.

Properties of Example Inks 1 and 2

| Property | Example Ink 1 | Example Ink 2 |
| --- | --- | --- |
| Surface Tension (dyne/cm) | 34 | 34.1 |
| Viscosity (mPa·s) | 14.9 | 13.5 |
| Density (g/cm$^3$) | 1.163 | 1.207 |
| Conductivity | 0.048 | 0.022 |
| Particle size (nm) | 290 | 290 |

The surface tension was measured at 25° C. using a Kruss K-11 Tensiometer (Wilhelmy Plate Method).

Viscosity was measured at 32° C. using a Brookfield DV-II or DV-II+ digital viscometer with UL-adapter and water jacket and spindle S00 at 3 or 12 rpm depending on whether the viscosity is < or >16 mPa·s.

Density (specific gravity) of the ink was measured using a pycnometer.

Conductivity was measured using an Orion conductivity meter.

Particle size was measured using a Zetasizer from Malvern Instruments.

Stability of Example Inks 1 and 2

Ink samples were stored for 4 weeks at RT, 40° C. and 60° C. After each week colloidal stability with respect to pH, viscosity, particle size by dynamic light scattering (DLS), sedimentation by backscattering light (Turbiscan®) as well as re-dispersability testing were carried out. The inks demonstrated remarkable stability with respect to particle size and re-dispersability. Downward drift in pH and upward trend in viscosity were observed at elevated temperature. In a separate experiment an accelerated shelf-life study was conducted by storing samples at RT, 40° C. and 60° C. for 6 weeks. Samples were removed every other week and characterized for pH, surface tension, conductivity, particle size and viscosity. Measurements indicate samples showed minimum variability. It is expected that the ink will have a shelf-life of about 12 months with little or no agitation.

Printing of Example Inks 1 and 2

Example inks 1 and 2 were filtered through a 1.0 micron syringe filter (for small ink samples ~ up to 300 g) or through a Chipwich filter (for sample volume up to 1.0 L or more) and then added to individual ink cartridges. The cartridges were conditioned overnight before being installed in a printer and printed onto 10 pages of coloured paper or ink-jet transparency. In both cases the jetting performance of the printer was acceptable.

EXAMPLES 3 TO 16

| Component | Example Ink 3 | Example Ink 4 |
| --- | --- | --- |
| Titanium Dioxide | 12.00 | 12.00 |
| Ethylene Glycol | 10.00 | 10.00 |
| Chemguard S-103A | 0.06 | |
| Dynol 810 | | 0.19 |
| Glycerol | 20.00 | 20.00 |
| 2-Pyrrolidone | 5.00 | 5.00 |
| PEG 20,000 | 2.00 | 2.00 |
| NeoAcryl A2980 | 8.00 | 8.00 |
| Proxel GXL | 0.02 | 0.02 |
| Water | To 100 parts | To 100 parts |

| Component | Example Ink 5 | Example Ink 6 |
| --- | --- | --- |
| Titanium Dioxide | 12.00 | 12.00 |
| Ethylene Glycol | 10.00 | 10.00 |
| Dynol 810 | 0.19 | 0.30 |
| Glycerol | 20.00 | 30.00 |
| 2-Pyrrolidone | 5.00 | 5.00 |
| PEG 20,000 | 2.00 | 2.00 |
| Rovene 6102 | 6.00 | |
| NeoRez R551 | | 3.00 |
| Rovene 5499 | | 3.00 |
| Proxel GXL | 0.02 | 0.02 |
| Water | To 100 parts | To 100 parts |

| Component | Example Ink 7 | Example Ink 8 |
| --- | --- | --- |
| Titanium Dioxide | 12.00 | 12.00 |
| Ethylene Glycol | 10.00 | 10.00 |
| Dynol 810 | 0.19 | |
| Chemguard S-103A | | 0.06 |
| Glycerol | 20.00 | 20.00 |
| 2-Pyrrolidone | 5.00 | 5.00 |
| PEG 20,000 | 2.00 | 2.00 |
| Rovene 6102 | 8.00 | |
| NeoAcryl A2980 | | 5.60 |
| NeoRez R551 | | 2.40 |
| Proxel GXL | 0.02 | 0.02 |
| Water | To 100 parts | To 100 parts |

| Component | Example Ink 9 | Example Ink 10 |
| --- | --- | --- |
| Titanium Dioxide | 12.00 | 12.00 |
| Ethylene Glycol | 10.00 | 10.00 |

| Component | Example Ink 9 | Example Ink 10 |
|---|---|---|
| Dynol 810 | | 0.15 |
| Chemguard S-103A | 0.06 | |
| Glycerol | 26.00 | 26.00 |
| 2-Pyrrolidone | 5.00 | 5.00 |
| PEG 20,000 | 2.00 | 2.00 |
| NeoAcryl A2980 | 4.00 | 4.00 |
| Proxel GXL | 0.02 | 0.02 |
| Water | To 100 parts | To 100 parts |

| Component | Example Ink 11 | Example Ink 12 |
|---|---|---|
| Titanium Dioxide | 12.00 | 8.00 |
| Ethylene Glycol | 10.00 | 10.00 |
| Chemguard S-103A | 0.05 | 0.06 |
| Glycerol | 24.00 | 30.00 |
| 2-Pyrrolidone | 5.00 | 5.00 |
| PEG 20,000 | 2.00 | 2.00 |
| NeoAcryl A2980 | 2.00 | 4.00 |
| NeoRez R551 | 3.00 | |
| Proxel GXL | 0.02 | 0.02 |
| Water | To 100 parts | To 100 parts |

| Component | Example Ink 13 | Example Ink 14 |
|---|---|---|
| Titanium Dioxide | 12.00 | 12.00 |
| Ethylene Glycol | 10.00 | 10.00 |
| Dynol 810 | 0.05 | |
| Chemguard S-103A | 0.05 | |
| Triton HW-1000 | | 0.22 |
| Glycerol | 26.00 | 26.00 |
| 2-Pyrrolidone | 5.00 | 5.00 |
| PEG 20,000 | 2.00 | 2.00 |
| NeoAcryl A2980 | 4.00 | 4.00 |
| Proxel GXL | 0.02 | 0.02 |
| Water | To 100 parts | To 100 parts |

| Component | Example Ink 15 | Example Ink 16 |
|---|---|---|
| Titanium Dioxide | 12.00 | 12.00 |
| Ethylene Glycol | 10.00 | 10.00 |
| Surfynol 465 | | 1.00 |
| Dynol 810 | 0.51 | |
| Glycerol | 25.00 | 24.00 |
| 2-Pyrrolidone | 5.00 | 5.00 |
| PEG 20,000 | 2.00 | 2.00 |
| NeoAcryl A2980 | | 4.00 |
| NeoRez R600 | 4.00 | |
| Proxel GXL | 0.02 | 0.02 |
| Water | To 100 parts | To 100 parts |

Surfynol® 465 is an ethoxylated acetylenic surfactant from Air Products.

Dynol® 810 is an ethoxylated acetylenic surfactant from Air Products.

Chemguard S-103A is a short-chain perfluoro-based anionic fluorosurfactant from Chemguard.

NeoRez® R551 is a polyurethane dispersion from Neo Resins.

NeoRez R600 is a polyurethane dispersion from Neo Resins.

NeoCryl® A2980 is an acrylic dispersion from Neo Resins.

Incorez W835/177 is a polyurethane dispersion from Incorez. The glass transition temperature (Tg) of Incorez W835/177 was determined by means of differential scanning calorimetry and was found to be −15.3° C.

Rovene® 5499 is a styrene butadiene dispersion from Mallard Creek Polymers. The Tg of Rovene 5499 is 0° C.

Rovene® 6102 is a styrene acrylic dispersion from Mallard Creek Polymers. The Tg of Rovene 6102 is 20° C.

Proxel® GXL is a 20% solution of 1,2-benzisothazolin-3-one in dipropylene glycol from Lonza.

| Example Ink | pH | Surface Tension dynes/cm | Viscosity at 32° C. mPa · s |
|---|---|---|---|
| 3 | 8.5 | 36.4 | ND |
| 4 | 8.5 | 35 | 12.6 |
| 5 | ND | 34.6 | 12.8 |
| 7 | ND | 35 | ND |
| 8 | 8.5 | 33.9 | 12.6 |
| 9 | 8.5 | 36.6 | 12.4 |
| 10 | 8.6 | 35.6 | 12.3 |
| 11 | 8.6 | 35.1 | 12.8 |
| 12 | 8.5 | 35.1 | 12.4 |
| 13 | 8.5 | 33.2 | 12.9 |
| 14 | 8.6 | 33.6 | 12.8 |
| 15 | 8.5 | 33.9 | 12.5 |
| 16 | 8.4 | 33.8 | 12.0 |

*ND = not determined.

Inks 3 and 8 to 16 were printed through a StarFire® SG1024 re-circulating print head from Fujifilm Dimatix. All inks printed without any problems to give high quality prints.

The invention claimed is:

1. An ink comprising:
   (a) from 1 to 20 parts of surface treated titanium dioxide;
   (b) from 20 to 70 parts of viscosity modifier;
   (c) from 5 to 30 parts of one or more water miscible polar organic solvent(s);
   (d) from 0.1 to 3 parts of surfactant;
   (e) from 0.001 to 5 parts of biocide;
   (f) from 0 to 20 parts of polymer particles;
   (g) the balance to 100 parts water;
   wherein the ink has a viscosity in the range of from 10 to 25 mPa·s when measured at 32° C. utilizing a Brookfield spindle S00 at 3 or 12 rpm depending on whether the viscosity is < or >16 mPa·s.

2. The ink as claimed in claim 1 wherein the surface of the surface treated titanium dioxide is coated with an inorganic compound selected from the group consisting of silica, alumina, alumina-silica or zirconia.

3. The ink as claimed in claim 1 wherein the surface of the surface treated titanium dioxide is treated with alumina, silica or a mixture thereof.

4. The ink as claimed in claim 1 wherein component (b) comprises from 20 to 60 parts of glycerol or a mixture of glycerol and polyethylene glycol.

5. The ink as claimed in claim 1 wherein component (c) comprises 1 to 3 solvents selected from the group consisting of 2-pyrrolidone, ethylene glycol and diethylene glycol.

6. The ink as claimed in claim 1 wherein component (d) comprises an acetylenic surfactant.

7. The ink as claimed in claim 1 comprising:
   (i) from 1 to 12 parts of surface treated titanium dioxide;
   (ii) from 20 to 60 parts of glycerol or a mixture of glycerol and polyethylene glycol;
   (iii) from 5 to 20 parts of water miscible organic solvent consisting of 1 to 3 solvents selected from the group consisting of 2-pyrrolidone, ethylene glycol and diethylene glycol;
   (iv) from 0.05 to 1.5 parts of an acetylenic surfactant;

(v) from 1 to 12 parts of polymer particles;
(vi) the balance to 100 parts water; and
wherein the ink has a viscosity in the range of from 10 to 20 mPa·s when measured at 32° C. utilizing a Brookfield spindle S00 at 3 or 12 rpm depending on whether the viscosity is < or >16 mPa·s.

8. An ink-jet printing process wherein the ink according to claim 1 is printed onto a substrate by means of an ink jet printer.

9. A substrate printed by an ink-jet printing process according to claim 8 utilizing an ink comprising
   (a) from 1 to 20 parts of surface treated titanium dioxide;
   (b) from 20 to 70 parts of viscosity modifier;
   (c) from 5 to 30 parts of one or more water miscible polar organic solvent(s);
   (d) from 0.1 to 3 parts of surfactant;
   (e) from 0.001 to 5 parts of biocide;
   (f) from 0 to 20 parts of polymer particles;
   (g) the balance to 100 parts water;
wherein the ink has a viscosity in the range of from 10 to 25 mPa·s when measured at 32° C. utilizing a Brookfield spindle S00 at 3 or 12 rpm depending on whether the viscosity is < or >16 mPa·s.

10. An ink-jet printer ink container containing an ink according to claim 1.

11. An ink-jet printer with re-circulating printer head containing an ink according to claim 1.

* * * * *